US010260806B2

(12) United States Patent
Wentworth et al.

(10) Patent No.: US 10,260,806 B2
(45) Date of Patent: Apr. 16, 2019

(54) VEHICLE WASH DRYING SYSTEM

(71) Applicant: Motor City Wash Works, Inc., Wixom, MI (US)

(72) Inventors: Robert J. Wentworth, Farmington Hills, MI (US); Lionel Belanger, Northville, MI (US)

(73) Assignee: Motor City Wash Works, Inc., Wixom, MI (US)

( * ) Notice: Subject to any disclaimer, the term of this patent is extended or adjusted under 35 U.S.C. 154(b) by 436 days.

(21) Appl. No.: 15/137,434

(22) Filed: Apr. 25, 2016

(65) Prior Publication Data

US 2016/0238316 A1 Aug. 18, 2016

Related U.S. Application Data

(63) Continuation of application No. 13/411,985, filed on Mar. 5, 2012, now Pat. No. 9,328,959.

(60) Provisional application No. 61/449,239, filed on Mar. 4, 2011.

(51) Int. Cl.
F26B 13/10 (2006.01)
F26B 5/16 (2006.01)
B60S 3/00 (2006.01)
F26B 15/10 (2006.01)
B60S 3/06 (2006.01)

(52) U.S. Cl.
CPC ............... F26B 5/16 (2013.01); B60S 3/002 (2013.01); B60S 3/06 (2013.01); F26B 15/10 (2013.01); F26B 2210/12 (2013.01)

(58) Field of Classification Search
CPC ....... B60S 1/68; B60S 3/002; G03G 21/0011; A47L 11/292; A46B 13/001; B44D 3/006
See application file for complete search history.

(56) References Cited

U.S. PATENT DOCUMENTS

| 2,824,318 | A |   | 2/1958  | Marzolf |            |
|-----------|---|---|---------|---------|------------|
| 2,968,824 | A | * | 1/1961  | Beech   | B44D 3/006 |
|           |   |   |         |         | 134/900    |
| 4,250,591 | A | * | 2/1981  | Mello   | B60S 3/002 |
|           |   |   |         |         | 15/309.2   |
| 4,304,026 | A |   | 12/1981 | Borostyan |          |
| 5,188,394 | A | * | 2/1993  | Roche   | B60S 1/68  |
|           |   |   |         |         | 172/606    |
| 5,432,974 | A |   | 7/1995  | Yasutake et al. |    |
| 5,613,260 | A |   | 3/1997  | Belanger et al. |    |
| 5,713,092 | A |   | 2/1998  | Belanger et al. |    |
| 5,784,748 | A |   | 7/1998  | Belanger et al. |    |

(Continued)

FOREIGN PATENT DOCUMENTS

GB 2364034 A 1/2002

Primary Examiner — Jason Lau
(74) Attorney, Agent, or Firm — Quinn IP Law

(57) ABSTRACT

A drying station for a vehicle wash facility includes at least one rotatable drying wheel positioned adjacent a vehicle treatment area. The at least one rotatable drying wheel has a drying material disposed thereon and is configured to engage an exterior of the vehicle to remove water accumulated thereon. The drying station includes a beater device disposed adjacent the at least one rotatable drying wheel with the beater device and the drying wheel being engageable as the at least one rotatable drying wheel rotates. As the rotatable drying wheel spins, the drying material contacts the beater device to help minimize its level of saturation.

27 Claims, 7 Drawing Sheets

(56) References Cited

U.S. PATENT DOCUMENTS

| | | | |
|---|---|---|---|
| 5,881,424 | A | 3/1999 | Pleener |
| 6,287,388 | B1 | 9/2001 | Hahn |
| 6,463,616 | B1 | 10/2002 | Morokutti |
| 7,318,245 | B2 | 1/2008 | Ballard et al. |
| 2002/0046759 | A1* | 4/2002 | Caldwell ................ B60S 3/002 134/56 R |
| 2002/0083549 | A1 | 7/2002 | Deiterman et al. |
| 2007/0028406 | A1 | 2/2007 | MacNeil |
| 2007/0151054 | A1 | 7/2007 | MacNeil |
| 2007/0169720 | A1 | 7/2007 | Roy |
| 2009/0010096 | A1 | 1/2009 | Twu |
| 2009/0199880 | A1 | 8/2009 | Wentworth et al. |
| 2009/0205148 | A1 | 8/2009 | Wentworth |

* cited by examiner

VEHICLE WASH DRYING SYSTEM

CROSS-REFERENCE TO RELATED APPLICATIONS

The present application claims priority to and the benefit of U.S. patent application Ser. No. 13/411,985, filed on Mar. 5, 2012, and U.S. Provisional Application Ser. No. 61/449,239, filed on Mar. 4, 2011, which are hereby incorporated by reference in their entirety.

TECHNICAL FIELD

The present disclosure generally relates to a drying station for a vehicle wash system that provides improved drying performance while also decreasing the operational cost to the system operator. More specifically, the present disclosure relates to a drying station for a vehicle wash system that removes a larger amount of water from a vehicle exterior without increasing the energy used to achieve this improved drying performance.

BACKGROUND

Automated vehicle washing systems have been available for many years to automatically wash and dry vehicles. Large volume vehicle washing systems typically include a conveyer for moving a vehicle through a series of washing and rinsing stations, and finally, through a drying station, which serves to remove moisture from the exterior surface of the vehicle. Other systems, known as roll-overs, exist for washing and drying vehicles where the vehicle remains stationary and the machine moves over the vehicle to perform the washing, rinsing, and drying steps.

A variety of different types of drying stations have been employed to remove water from the exterior of the vehicle. One such drying station employs one or more dryers, which each include one or more nozzles. In these drying stations, the vehicle passes by the dryers, which emit high velocity air onto the vehicle, to blow water off the vehicle exterior. The dryers can take on various different configurations, can be placed in different locations, and can be oriented in a variety of different ways all to blow water off the vehicle exterior. Additionally, the dryers can be either stationary or oscillating. Regardless of the configuration, orientation, number of dryers or their movement, they suffer from a number of disadvantages, the foremost of which is that a significant amount of water remains on the vehicle exterior after the drying cycle is finished. Recognizing this deficiency, vehicle wash facilities often have excess water manually removed from the vehicle exterior, such as with hand towels as the vehicle leaves the wash facility. This increases the cost to the operator as a result of more labor requirements as well as additional expense associated with having clean hand towels available.

As a potential solution to this problem, friction drying stations have also been employed either in connection with or in place of the touch-less drying systems discussed above. These stations generally consist of a rotating wheel having a drying material affixed to a rotating shaft. As the shaft rotates, the drying material also rotates and contacts the vehicle exterior to absorb and wipe away water. The drying material typically consists of an artificial leather, shammy, or a very thick fast absorbing synthetic material. Vehicle washes have utilized these drying materials to "wipe cars dry" after the car has passed under the forced air dryers. These friction drying stations did not solve the insufficient drying problem for a couple of reasons.

One reason that these friction drying stations did not work sufficiently, is that the drying material would become oversaturated after a relatively short period of time. When this occurred, the drying station became ineffective since the drying material could not remove any more water from the vehicle exterior. Additionally, when the drying station was used to dry multiple cars in succession, the drying material could not dry quick enough to remove a sufficient amount of water. Thus, after drying only a few cars, the problem of insufficient drying remained. Moreover, as the drying material absorbed more water, more energy was required to rotate the wheel, which increased the cost to run the wash system.

A second deficiency with these prior drying machines is that the drying material for these friction drying systems can quickly become contaminated with dirt. Thus, while the drying machine is supposed to be wiping cars clean through the contact of the drying material with the vehicle exterior, once the drying material becomes contaminated with dirt, the dirt will be transferred back onto the vehicle and can even scratch the vehicle surface. The previously accepted solution to this later problem was to have two sets of drying material. When the first set became contaminated through use, the second set would be substituted therefore while the first set was washed and cleaned. This solution was expensive and required constant labor and attention to not only clean the drying material, but swap the sets of drying material.

It would therefore be advantageous to provide a drying station for a vehicle washing system that overcomes these disadvantages.

SUMMARY

It is therefore an advantage of the present disclosure to provide a drying station for a vehicle wash system that removes a greater percentage of water from a vehicle exterior than occurs with prior vehicle drying stations.

It is another advantage of the present disclosure to provide a drying station for a vehicle wash system that removes a sufficient amount of water from a vehicle exterior such that no manual drying is required after the vehicle passes through the drying station.

It is still another advantage of the present disclosure to provide a drying station for a vehicle wash system that has multiple drying stages to provide increased drying performance.

It is yet another advantage of the present disclosure to provide a drying station for a vehicle wash system that employs apparatus that contacts the vehicle exterior to effectuate contact drying.

It is a further advantage of the present disclosure to provide a drying station for a vehicle wash system that minimizes saturation of the drying material or maintains the drying material below the saturation point to provide increased drying performance.

It is still a further advantage of the present disclosure to provide a drying station for a vehicle wash system that employs one or more adjustable parameters to keep the drying material below saturation.

It is still yet a further advantage of the present disclosure to provide a drying station for a vehicle wash system that includes a cleaning mechanism, which allows for frequent cleaning of the drying material employed by the drying station to provide enhanced performance.

It is still yet another advantage of the present disclosure to provide a drying station for a vehicle wash system that performs a waxing function concurrently with the drying function.

It is still yet a further advantage of the present disclosure to provide a vehicle wash facility that yields a drier vehicle exterior at less cost, without increased energy usage, and with decreased labor costs.

In accordance with the above and the other advantages of the present disclosure, a drying station for a vehicle wash facility is provided. The drying station includes at least one rotatable drying wheel positioned adjacent a vehicle treatment area. The at least one rotatable drying wheel has a drying material disposed thereon and is configured to engage an exterior of the vehicle to remove water accumulated thereon. The drying station includes a beater device disposed adjacent the at least one rotatable drying wheel. The at least one rotatable drying wheel and the beater device are engageable such that as the at least one rotatable drying wheel rotates, the drying material contacts the beater device to help minimize its level of saturation.

DETAILED DESCRIPTION

Figure 1:
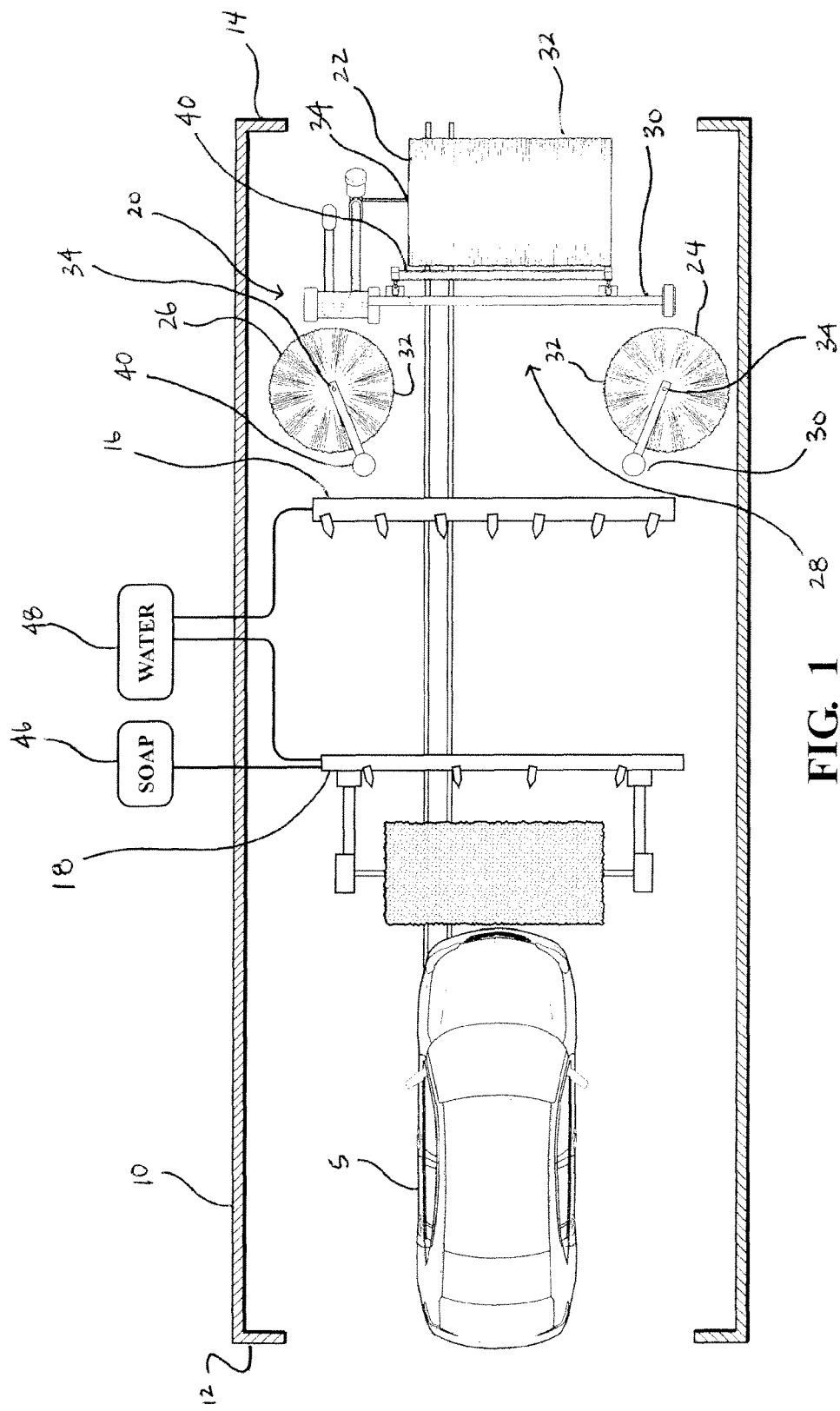
FIG. 1 is a schematic illustration of a vehicle wash facility employing a drying station in accordance with a preferred embodiment of the present disclosure.

The present disclosure relates to a drying station for drying a vehicle exterior in a vehicle wash system. FIG. 1 schematically illustrates a vehicle wash system in accordance with the present disclosure. As shown, a vehicle 5 enters a facility 10 at an entrance end 12 and exits the facility at an exit end 14. Within the vehicle facility 10, the vehicle 5 is conveyed through various stations where it is subjected to certain vehicle treatment processes that make up the vehicle wash system. The vehicle treatment processes preferably includes a rinsing at a rinse station 16, a washing at a wash station 18, and a drying at a drying station 20. It will be understood that the preferred vehicle wash system can include any number of other processes, such as waxing, to which the vehicle may be subjected. Additionally, while the vehicle wash system is illustrated as a tunnel-type wash, it will be understood that the vehicle wash system can also be configured as part of a roll over-type wash.

The present disclosure relates to the drying station 20 of the vehicle wash system. In a preferred embodiment, the drying station 20 is positioned adjacent the exit end 14 of the vehicle wash system. Additionally, the vehicle wash system is preferably of the tunnel-type where multiple vehicles can pass through the wash system in succession. As is known, typical drying apparatus utilized in existing vehicle wash systems include forced air blowers. However, even with these forced air blowers, residual water is left on the vehicle. This is true even if the force output for these air blowers is increased. While other drying apparatus have been employed, they similarly fail to provide sufficient drying of the vehicle exterior. Consequently, to remove this residual water, vehicle wash systems often employ manual drying as the vehicle exits the vehicle wash tunnel. This manual process substantially increases the cost of washing and drying the vehicle exterior, including in the form of labor expense as well as the expense to wash and dry the towels used to manually remove the residual water.

With reference to the figures, the preferred drying station 20 includes a plurality of rotatable drying wheels for contacting the vehicle exterior as the vehicle is conveyed through the drying station 20 of the vehicle wash system. As shown, the drying station 20 preferably includes a top wheel 22 for contacting the top of the vehicle and a pair of side wheels 24, 26 that engage opposing sides of the vehicle as it is passes through vehicle treatment area 28 of the drying station 20. The vehicle treatment area 28 is generally bounded by the frames 40 that support the rotatable drying wheels. It will be understood that the drying station 20 can include more or less rotatable drying wheels that are designed to contact different portions of the vehicle exterior, as desired.

As shown each of the rotatable drying wheels includes a drying material 32 for removing water from the vehicle exterior with the drying material being secured to a rotatable shaft 34. It will be understood that the drying material 32 can take on a variety of different configurations including as a plurality of individual strips or as wheels of drying material. While cloth is the preferred drying material, a variety of different types of materials can be utilized. For example, a preferred embodiment employs a drying material having the following characteristics: thin, absorbent, flexible, non-lint, durable, and spun-bond. It will also be understood that the drying material can employ more or less than the characteristics set forth above. An exemplary drying material is available from Oxco.com. Additionally, the rotatable drying wheels preferably eliminate the need for any other drying mechanism, such as blowers. However, it will be appreciated that the top wheel and/or the side wheels may be employed in combination with other drying apparatus, such as blowers, as part of the vehicle wash system. Put another way, the drying system of the present disclosure may be utilized to enhance existing drying apparatus or may be utilized in place of other drying apparatus.

It will be understood by one of ordinary skill in the art that as the drying material picks up (absorbs) water from the vehicle exterior, it can become saturated, particularly if the vehicle output through the facility is high enough. It will be understood by one or ordinary skill in the art that as the drying material contacts the vehicle exterior and absorbs water, it retains more water until it becomes saturated. When the drying material reaches this condition, it is unable to do a satisfactory job drying the vehicle and only pushes water around on the vehicle exterior. The drying station 20 of the present disclosure provides methods and apparatus to help dissipate water from the drying material, dry the material and allow it to perform a drying function, as discussed below.

Figure 2:
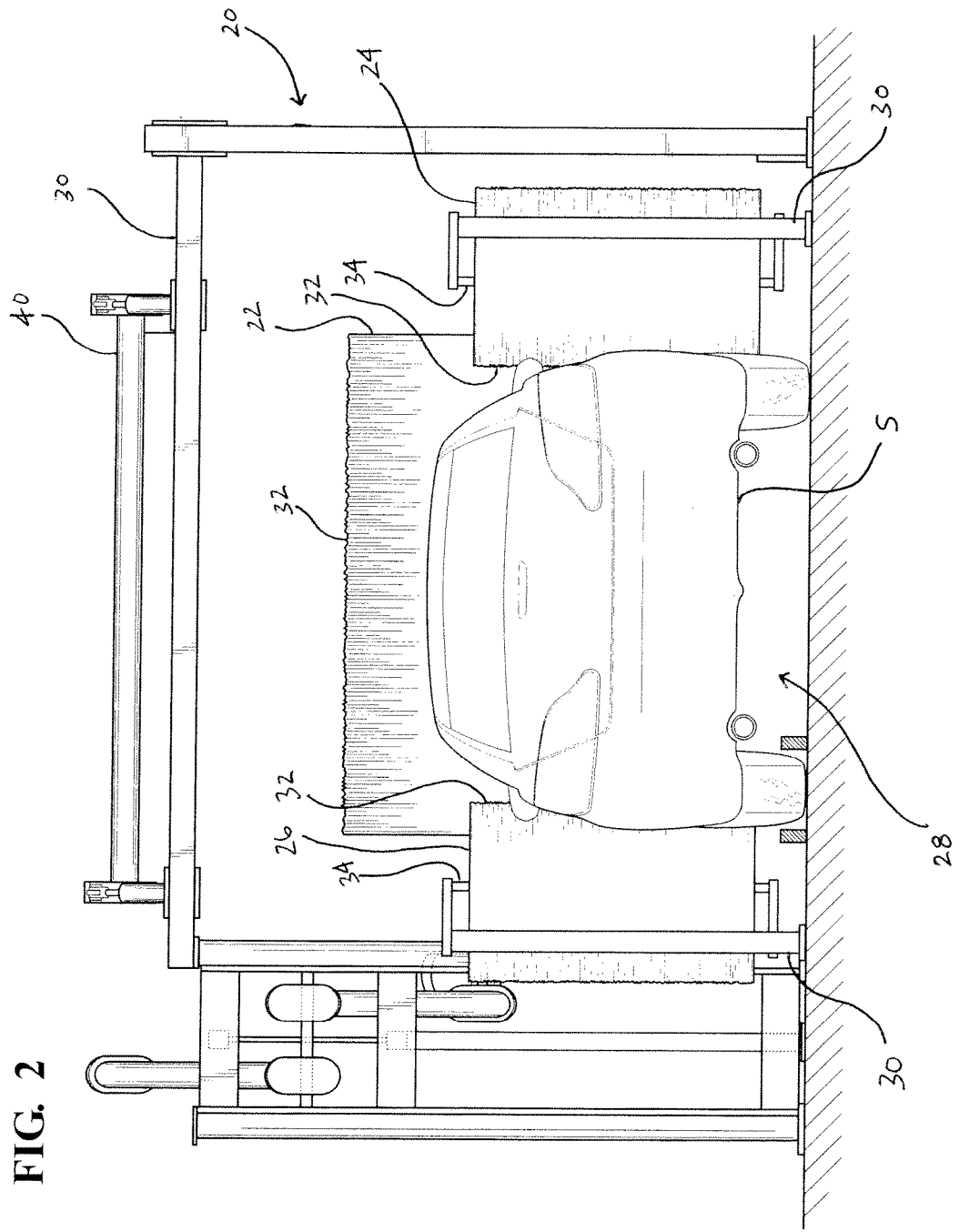
FIG. 2 is a front view of a drying station with a drying device disposed in a first position in accordance with a preferred embodiment of the present disclosure.
Figure 3:
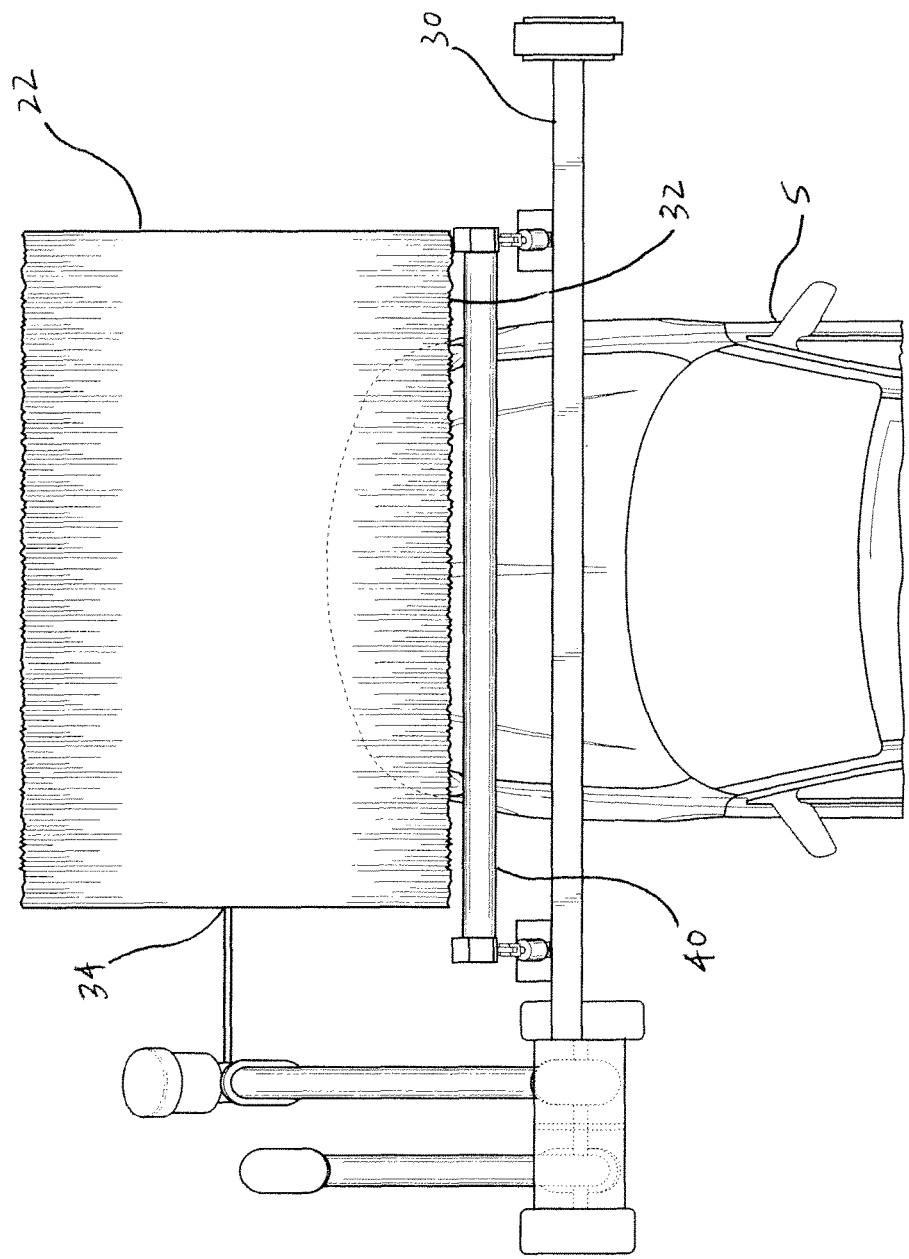
FIG. 3 is top view of a portion of the drying station of FIG. 2.
Figure 4:
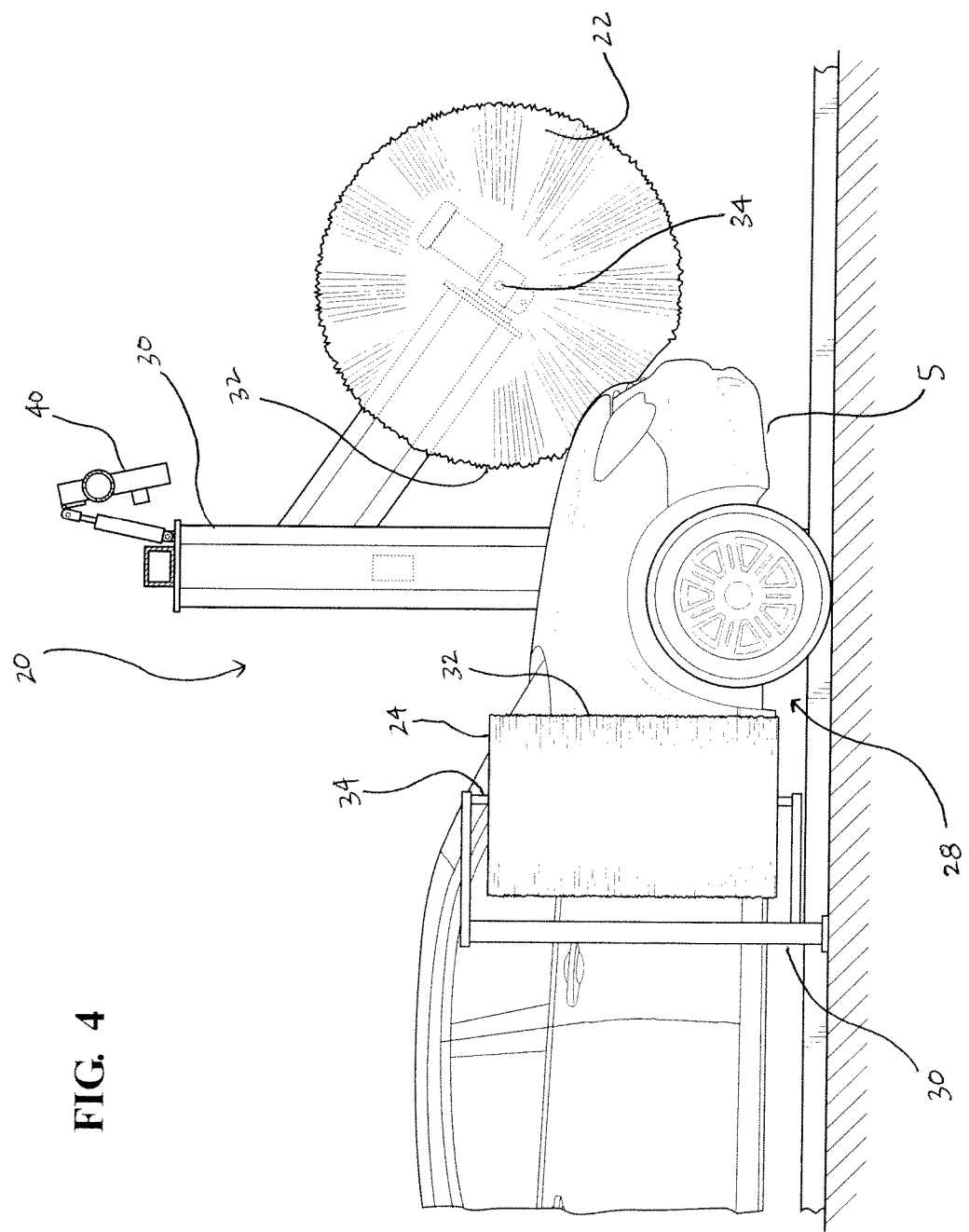
FIG. 4 is a side view of the drying station of FIG. 2.
Figure 5:
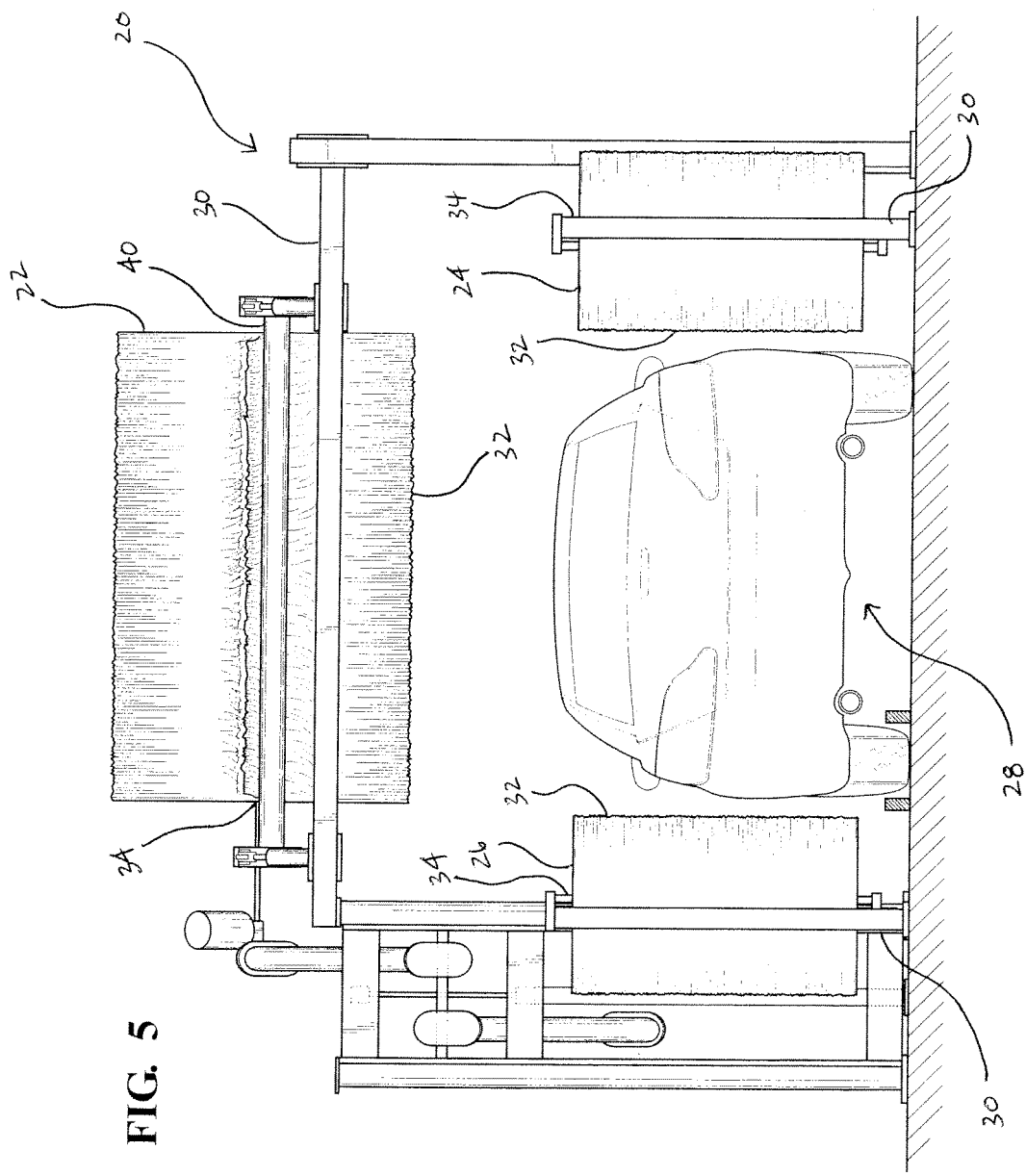
FIG. 5 is a front view of a drying station with a drying device disposed in a second position in accordance with a preferred embodiment of the present disclosure.
Figure 6:
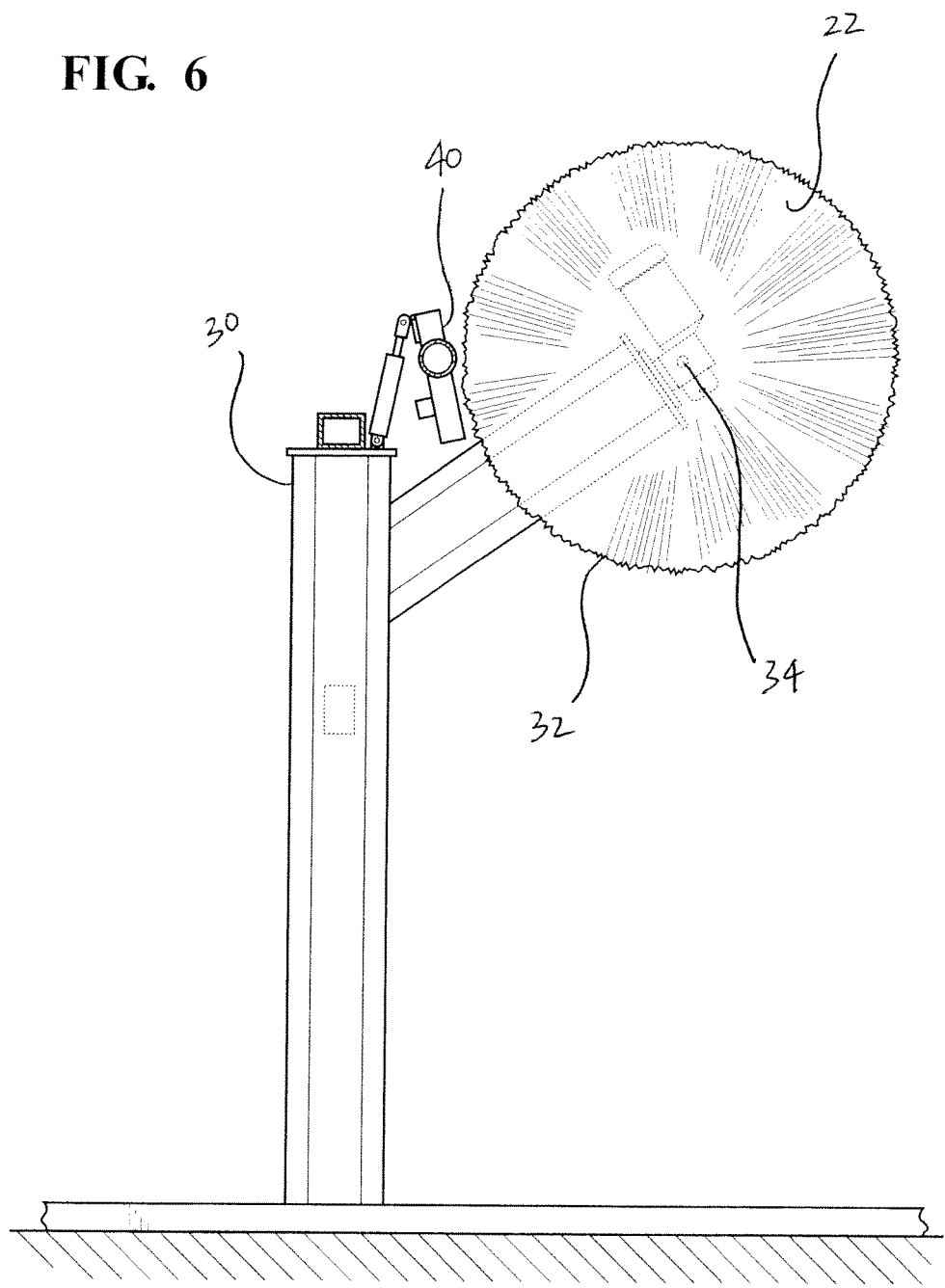
FIG. 6 is a side view of a portion of the drying station of FIG. 5.
Figure 7A:
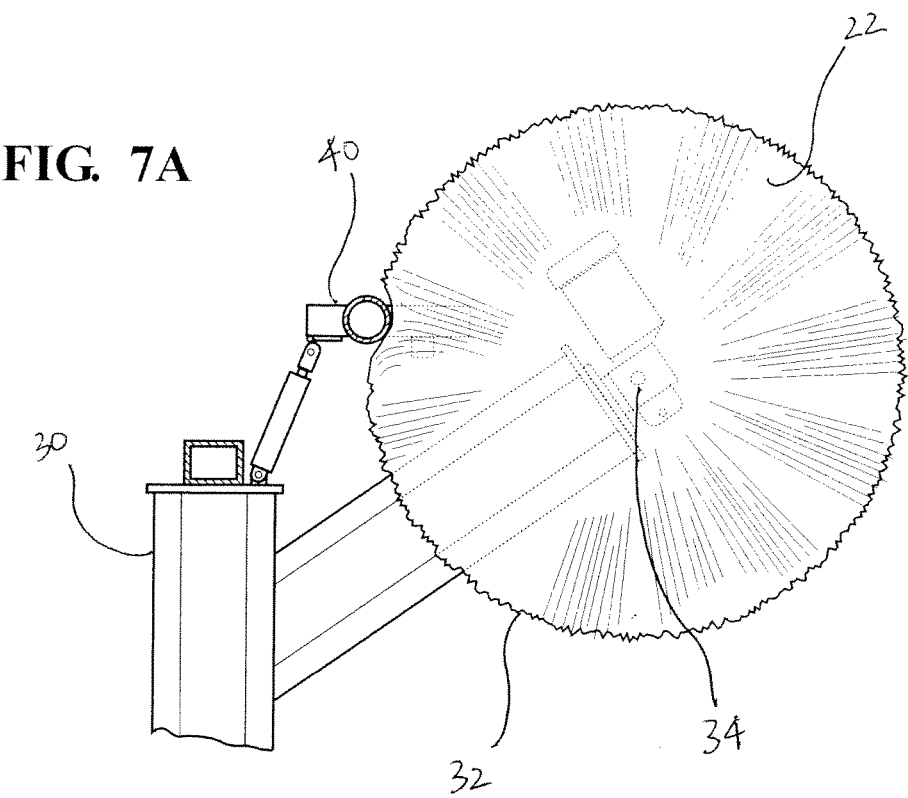
FIGS. 7A and 7B are side views of a portion of the drying station with a beater device moved to a retracted position in accordance with a preferred embodiment of the present disclosure.
Figure 7B:
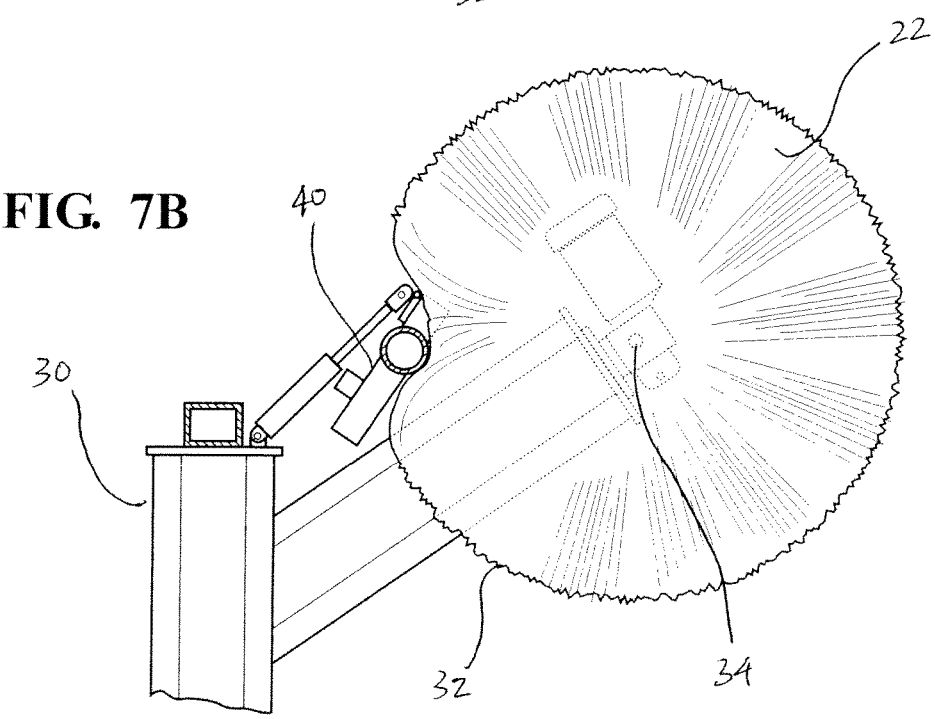

A preferred embodiment of the drying station 20 is shown in FIGS. 2 through 4, which illustrate a rotatable top wheel 22 in a first position where the drying material 32 is disposed in a position to engage the vehicle exterior as the vehicle passes through the drying station 20. After successive vehicles pass through the drying station 20 and water is removed from the exteriors thereof, the drying material 32 can become saturated, which diminishes its drying ability. To minimize the level of saturation, in accordance with the present disclosure, the water is removed from the drying material. Specifically, in accordance with one embodiment, to minimize the level of saturation of water in the drying material 32, one or more of the rotatable drying wheels can be moved from the first vehicle engaging position (FIGS. 2-4) to a second retracted position (FIGS. 6-7). As shown in FIGS. 6 through 7, when the rotatable drying wheels are moved to the retracted position, the drying material 32 is removed from the vehicle treatment area 28 and cannot engage the vehicle. In the retracted position, the drying material 32 is subjected to a drying process to remove water therefrom to allow the drying material 32 to continue to remove water from the vehicle exterior.

In accordance with one embodiment, when the rotatable drying wheels are moved to the second retracted position, they are kept rotating by a controller, as discussed below. By continuing to rotate the wheels, centrifugal force causes any water maintained in the drying material to travel to its tips and eventually leave the drying material as the spinning continues. The rotational speed of the wheels may also be increased from the speed at which they contact the vehicle to speed up the rate of drying of the drying material by increasing the centrifugal force. It will be understood that in the retracted position, the drying material may be moved away from the conveyer line along which a vehicle travels. Alternatively, in accordance with another preferred embodiment, the rotatable drying wheel may remain in the first position adjacent the vehicle treatment area and may be rotated at an increased speed when no vehicles are present or between vehicles to remove water from the drying material 42 through centrifugal force.

In accordance with another preferred embodiment, the drying station 20 includes a beater device 40 that can be positioned adjacent one or more of the top wheel 22 and the side wheels 24, 26 to allow for selective engagement of the rotatable drying wheel with the device 40. The beater device 40 is preferably attached to the frame 30 and is moveable between a first location and a second location. The beater device 40 is preferably an elongated bar or rod and is constructed from a plastic material. The beater device 40 has a length that in one embodiment, is at least as long as the length of the rotatable wheels. However, it will be understood that the device 40 can be formed of a variety of different materials and be constructed of a variety of different sizes and shapes.

In one preferred embodiment shown in FIG. 4, when the beater device 40 is in the first location, it is engageable with the drying material 32 when the rotatable drying wheel is in its second position. When the beater device 40 engages the rotatable drying wheels, as they rotate, the drying material contacts the beater bar to drive or "slap" the water off. In this embodiment, when the beater device 40 is in the second location, it is retracted away from the drying material 32 so that the rotatable drying wheel can spin freely when in the second position without the drying material 32 contacting the device 40.

In another embodiment, when the device 40 is moved to the first location, the rotatable drying wheel is in the first portion where it can engage a vehicle in the vehicle treatment area 28. In this embodiment, the rotatable drying wheel does not need to move to the second position to engage the device 40. When the device 40 is in the second location in this embodiment, it is also retracted from engagement with the drying material 32 on the rotatable drying wheel. It will also be understood that in another embodiment, the beater device 40 may be stationary and the wheels may be brought into contact therewith. In connection with still another embodiment, the beater device 50 is configured such that it maintains constant contact with the wheels, such as opposite their engagement with the vehicle, to continuously expel or "slap" water therefrom as the wheel rotate.

The drying system is preferably in communication with a controller 42, such as a programmable logic controller (PLC) or other computer that controls a variety of different features. For example, the controller 42 can be programmed to automatically take steps to minimize the saturation level of the drying material, such as, to cause one or more of the rotatable drying wheels 22, 24, 26 to spin between engagement with vehicles or to instruct one or more of the rotatable drying wheels 22, 24, 26 to move to a second position away from the vehicle treatment area to either spin or engage the beater device 40. Additionally, the PLC can be programmed to move the beater device 40 into and out of engagement with the rotating wheels. It will be appreciated that the controller can be programmed to accomplish the functions and features above to minimize the saturation level of the drying material based on certain predetermined events or triggers.

For example, the engagement of the beater device 40 with the rotatable drying wheels can be based on the amount of vehicles passing through the vehicle wash system over a given period of time. It will be understood that the beater device 40 and the rotatable drying wheel could engage after each vehicle passes. By way of another example, the draw and current required to rotate the rotatable drying wheels' rolls can be monitored. As is known, as the drying material 32 becomes more saturated, the surface tension between the drying material 32 and the vehicle increases, which thus increases the current required to effectuate rotation. Thus, this variable can be monitored and when the measured draw reaches or exceeds a certain amount, the controller 42 can be programmed to cause a drying function to be performed on the drying material, such as the increased rotational speed or beater device 40 engagement, as discussed above. In addition to these preferred drying methods, others may be employed including subjecting the drying medium to the output of a forced air blower to blow water from the drying media.

In another aspect, the engagement between the rotatable drying wheel and the beater device 40 can be accomplished by varying the speed of the rotatable drying wheel. While the present aspect is described in connection with a drying wheel, it will be understood that it could be applied to one or more drying wheels within a vehicle wash system. The drying wheel can be rotated at a first speed when it is contacting a vehicle to effectuate a drying function. The drying wheel can be rotated at a second greater speed to effectuate contact with the beater device. It will be understood that the drying wheel may be kept stationary with respect to the beater device and only engages the beater device upon rotation of the drying wheel at an increased speed. In accordance with still another aspect, the drying wheel can be rotated at a third faster speed in order to more fully remove moisture from the drying media. The drying wheel may be removed from engagement with the beater device 40 when rotated at this third speed. It will be understood that more speeds may also be employed as desired to effectuate different functions.

Moreover, the controller 42 can be programmed such that the rotatable drying device is spun to remove water from the drying material at predetermined increments of time. Additionally, the rotatable drying wheels can be rotated by the controller 42, whenever another vehicle enters the vehicle wash system. It will also be understood that the rotatable drying wheels can be rotated at the end or the beginning of each business day, as desired. The controller 52 can obviously be programmed to actuate in accordance with these and other criteria or conditions.

It will be understood that as the drying material 32 contacts vehicles throughout the day, it will tend to accumulate dirt. It is undesirable to have a dirty cloth or drying material contact a vehicle. For example, the dirt on the drying material can scratch the vehicle exterior. To eliminate this problem, in accordance with the present disclosure, the drying material can be cleaned during off hours, such as at night. To clean the drying material, it is preferable to spray soap and water there for purposes of washing it. To accomplish this function, in accordance with a preferred embodiment, a supply of soap 46 and a supply of water 48 are in communication with the rotating wheel. The supply of soap 46 and water 48 are also in communication with the controller 42. In accordance with this embodiment, when the vehicle wash facility is shut down, such as, for the evening, the rotatable drying wheel can be moved to the second or retracted position. As actuated by the controller 42, soap and water are preferably sprayed onto the drying medium 32 as the rotatable drying wheel is rotated. To assist in the cleaning process, the beater device 40 can be brought into contact with the drying material in order to help agitate it and remove any dirt thereon. Thereafter, the drying material can be subjected to a rinse cycle and then spun dry to get it ready for the next day. This process is preferably performed automatically. It will be understood that the controller 42 may be programmed to clean the drying material 32 more or less often. Additionally, the rotating wheels can be cleaned in the first position or a variety of other orientations.

In accordance with another embodiment of the present disclosure, the vehicle wash system also allows a vehicle to be polished or waxed as part of the drying cycle. Specifically, the wheels 22, 24, 26 can effectuate a waxing process concurrently with the drying process. For example, a wax could be applied to the drying material 32 of the wheels, such that as they contact the vehicle surface to remove residual water, they may also apply wax to the vehicle exterior and polish it while they continue to rotate. Alternatively, the wax can be applied directly to the vehicle exterior and then contacted by the drying material 32 as the wheel rotates to polish the vehicle. This configuration eliminates the need for a separate wax station which provides a significant space savings and cost savings over prior vehicle wash systems. Because the drying material 32 is not over-saturated, it can both absorb water from the vehicle exterior and also polish the vehicle. The present disclosure thus provides an improved vehicle wash and wax cycle.

In one embodiment of the integrated wash/wax feature, the vehicle can first travel through the final rinse stage for the removal of washing liquids that remain on the vehicle from the washing cycle of the wash system. Next, the vehicle may pass through a first dryer stage involving a plurality of forced air dryers or blowers. These forced air dryers will remove a large portion of water from the vehicle exterior, however a residual amount of water will remain on the vehicle exterior. The vehicle can then pass to another portion of the drying station consisting or rotating wheels, as discussed above, which will maximize removal of that residual water. Also, a fluid wax can be applied to either the vehicle exterior or the drying material 32 to polish the vehicle before it leaves the exit end 14. The rotatable drying wheels can be programmed to be cleaned after each wax cycle in accordance with the process discussed above.

During testing, the Applicant's demonstrated that the disclosed disclosure effectively removed the last 20% of water still remaining on vehicles directly following a 50 HP forced air dryer at a continuous operating rate of 100 cars per hour without reaching the point of saturation. The problem with the dirty drying material was addressed with a programmable automatic wash cycle that cleans and rinses the drying material when the car wash is closed. This self-cleaning of the drying material occurs without any labor or constant attention. The over saturation issue was addressed with a programmable automatic spin dry cycle that dramatically accelerates evaporation in between cars. By greatly increasing the RPM of the rotatable drying wheels when they are not in contact with a vehicle, centrifugal force pushes water to the outer diameter of the drying wheel. While the drying wheels are spinning at the higher RPMs in a spin dry cycle, in one embodiment, a beater device 40, such as a plastic bar the length of the drying wheels, can be forced into contact with the drying material to fling any accumulated water from the outer diameter of the drying wheels. The spin dry cycle allows the drying material on the wheel to always remain in a state of absorption and therefore always effective.

Many modifications and variations of the present disclosure are possible in light of the above teachings and may be practiced otherwise than as specifically described. These antecedent recitations should be interpreted to cover any combination in which the inventive novelty exercises its utility.

The invention claimed is:

1. A method of reducing saturation of a drying material of a drying wheel of a vehicle wash facility, the method comprising:
   rotating the drying wheel at a first speed, such that the drying material of the drying wheel is configured to engage an exterior of a vehicle; and
   rotating the drying wheel at a second speed, greater than the first speed, such that the beater device radially penetrates the drying wheel as the drying wheel rotates, such that the beater device drives moisture from the drying material;
   wherein the beater device is configured penetrate the drying material only when the drying wheel is rotating at a speed at least equal to the second speed.

2. The method, as set forth in claim 1, further comprising positioning the beater device adjacent the drying wheel, such that the beater device is configured to radially penetrate the drying material when the drying wheel is rotating.

3. The method, as set forth in claim 1, further comprising rotating the drying wheel such that the drying material is caused to engage the surface of the vehicle to remove moisture from the exterior of the vehicle.

4. A method of reducing saturation of a drying material of a drying wheel of a vehicle wash facility, the method comprising:
   rotating the drying wheel;
   radially penetrating the drying wheel with a beater device as the drying wheel rotates, such that the beater device drives moisture from the drying material;

monitoring, with a controller, a draw and a current being required to effectuate rotation of the drying wheel to dry an exterior of the vehicle with the drying material; and sending a signal from the controller to the drying wheel to effectuate rotation of the drying wheel to cause the beater device to radially penetrate the drying material when the required draw and current exceeds a threshold amount;

wherein rotating the drying wheel such that the beater device is caused to radially penetrate the drying material is in response to receiving the signal from the controller to effectuate rotation.

5. The method, as set forth in claim 1, further comprising moving the beater device from one of a first location and a second location to the other one of the first location and the second location;

wherein the beater device is positioned adjacent the drying wheel when the beater device is in the first location, such that the beater device radially penetrates the drying material when the drying wheel is rotating; and wherein the beater device is not positioned adjacent the drying wheel when the beater device is in the second location, such that the beater device is prevented from radially penetrating the drying material when the drying wheel is rotating.

6. The method, as set forth in claim 5, further comprising sending a signal from a controller to move the beater device from the one of the first location and the second location to the other one of the first location and the second location; and wherein moving the beater device is further defined as moving the beater device from one of a first location and a second location to the other one of the first location and the second location in response to receiving the signal from the controller to move the beater device.

7. A method of reducing saturation of a drying material of a drying wheel of a vehicle wash facility, the method comprising:

rotating the drying wheel;

radially penetrating the drying wheel with a beater device as the drying wheel rotates, such that the beater device drives moisture from the drying material;

moving the drying wheel from one of a first position and a second position to the other one of the first position and the second position;

wherein the beater device is positioned adjacent the drying wheel when the drying wheel is in the second position, such that the beater device is configured to radially penetrate the drying material when the drying wheel is rotating to drive moisture from the drying material; and wherein the drying material of the drying wheel is prevented from engaging the exterior of a vehicle when the drying wheel is positioned in the second position;

wherein the beater device is not positioned adjacent the drying wheel when the drying wheel is in the first position, such that the beater device is prevented from radially penetrating the drying material when the drying wheel is rotating; and wherein the drying material of the drying wheel is configured to engage an exterior of a vehicle when the drying wheel is positioned in the first position.

8. The method, as set forth in claim 7, further comprising sending a signal from a controller to move the drying wheel from the one of the first position and the second position to the other one of the first position and the second position; and moving the drying wheel is further defined as moving the drying wheel from the one of the first position and the second position to the other one of the first position and the second position in response to receiving the signal from the controller.

9. A method of reducing saturation of a drying material of a drying wheel of a vehicle wash facility, the method comprising:

rotating the drying wheel;

radially penetrating the drying wheel with a beater device as the drying wheel rotates, such that the beater device drives moisture from the drying material;

counting, with a controller, a quantity of vehicles having an exterior dried by the drying material when the vehicle is in the wash facility without having effectuated engagement of the beater device with the drying material of the drying wheel; and sending a signal from the controller to the drying wheel to effectuate rotation of the drying wheel when the counted quantity of quantity of vehicles having the exterior dried by the drying material is at least equal to a threshold quantity;

wherein rotating the drying wheel such that the beater device is caused to radially penetrate the drying material is in response to receiving the signal from the controller to effectuate rotation.

10. The method, as set forth in claim 9, further comprising:

sending a signal from a controller to a supply of liquid; and actuating the supply of water such that water is sprayed on the drying material in response to receiving the signal from the controller.

11. The method, as set forth in claim 10, further comprising:

sending a signal from the controller to a supply of soap; and actuating the supply of soap such that soap is applied to the drying material of the drying wheel in response to receiving the signal from the controller;

wherein radially penetrating the drying wheel with a beater device as the drying wheel rotates is further defined as radially penetrating the drying wheel with a beater device as the drying wheel rotates such that the beater device agitates the drying wheel and drives moisture and dirt from the drying material.

12. A method of reducing saturation of a drying material of a plurality of drying wheels of a vehicle wash facility, the method comprising:

sending a signal to the drying wheel, from a controller, to effectuate rotation of the drying wheel at a first speed;

rotating the drying wheel at the first speed, in response to receiving the signal from the controller, such that the drying material of the drying wheel is configured to engage an exterior of a vehicle located in the vehicle wash facility;

sending another signal to the drying wheel, from the controller, to effectuate rotation of the drying wheel at a second speed; and rotating the drying wheel at the second speed, greater than the first speed, in response to receiving the other signal from the controller, such that the beater device is caused to radially penetrate the drying material to drive moisture from the drying material;

wherein the beater device cannot radially penetrate the drying material when the drying wheel is rotating at a speed less than the second speed.

13. The method, as set forth in claim 12, further comprising monitoring, with the controller, a draw and a current being required to effectuate rotation of the drying wheel; and sending a signal to the drying wheel, from the controller, to effectuate rotation of the drying wheel at the second speed to cause the beater device to radially penetrate the drying material when the draw and the current exceeds a threshold amount.

14. The method, as set forth in claim 12, further comprising moving the beater device from one of a first location and a second location to the other one of the first location and the second location;

wherein the beater device is positioned adjacent the drying wheel when the beater device is in the first location, such that the beater device radially penetrates the drying material when the drying wheel is rotating at the second speed; and wherein the beater device is not positioned adjacent the drying wheel when the beater device is in the second location, such that the beater device is prevented from radially penetrating the drying material when the drying wheel is rotating at the second speed.

15. The method, as set forth in claim 14, further comprising sending a signal from the controller to move the beater device from the one of the first location and the second location to the other one of the first location and the second location.

16. The method, as set forth in claim 12, further comprising moving the drying wheel from one of a first position and a second position to the other one of the first position and the second position;

wherein the beater device is positioned adjacent the drying wheel when the drying wheel is in the second position, such that the beater device radially penetrates the drying material when the drying wheel is rotating at the second speed; and wherein the beater device is not positioned adjacent the drying wheel when the drying wheel is in the first position, such that the beater device is prevented from radially penetrating the drying material when the drying wheel is rotating at each of the first speed and the second speed.

17. The method, as set forth in claim 16, further comprising sending a signal from a controller to move the drying wheel from the one of the first position and the second position to the other one of the first position and the second position;

wherein the drying material of the drying wheel is configured to engage an exterior of a vehicle in the drying station when the drying wheel is positioned in the first position; and wherein the drying material of the drying wheel is prevented from engaging the exterior of a vehicle in the drying station when the drying wheel is positioned in the second position.

18. The method, as set forth in claim 12, further comprising counting, with the controller, a quantity of vehicles having the exterior dried by the drying material without having effectuated engagement of the beater device with the drying material of the drying wheel; and sending a signal from the controller to the drying wheel to effectuate rotation of the drying wheel to rotate at the second speed when the counted quantity of quantity of vehicles having the exterior dried by the drying material is at least equal to a threshold quantity.

19. A method of reducing saturation of a drying material of drying wheel of a vehicle wash facility, the method comprising:

rotating the drying wheel at a first speed, such that the drying material of the drying wheel is configured to engage and remove moisture from an exterior of a vehicle located in the vehicle wash facility;

rotating the drying wheel at a second speed, greater than the first speed, such that centrifugal force pushes water to the outer diameter of the drying wheel to reduce a level of saturation of the drying material; and radially penetrating the drying wheel with a beater device as the drying wheel is rotating at the second speed, such that the beater device contacts the drying material to fling accumulated moisture from the outer diameter of the drying wheel.

20. The method, as set forth in claim 4, further comprising positioning the beater device adjacent the drying wheel, such that the beater device is configured to radially penetrate the drying material when the drying wheel is rotating.

21. The method, as set forth in claim 4, further comprising rotating the drying wheel such that the drying material is caused to engage the surface of the vehicle to remove moisture from the exterior of the vehicle.

22. The method, as set forth in claim 4, further comprising moving the beater device from one of a first location and a second location to the other one of the first location and the second location;

wherein the beater device is positioned adjacent the drying wheel when the beater device is in the first location, such that the beater device radially penetrates the drying material when the drying wheel is rotating; and wherein the beater device is not positioned adjacent the drying wheel when the beater device is in the second location, such that the beater device is prevented from radially penetrating the drying material when the drying wheel is rotating.

23. The method, as set forth in claim 22, further comprising sending a signal from a controller to move the beater device from the one of the first location and the second location to the other one of the first location and the second location; and wherein moving the beater device is further defined as moving the beater device from one of a first location and a second location to the other one of the first location and the second location in response to receiving the signal from the controller to move the beater device.

24. The method, as set forth in claim 9, further comprising positioning the beater device adjacent the drying wheel, such that the beater device is configured to radially penetrate the drying material when the drying wheel is rotating.

25. The method, as set forth in claim 9, further comprising rotating the drying wheel such that the drying material is caused to engage the surface of the vehicle to remove moisture from the exterior of the vehicle.

26. The method, as set forth in claim 9, further comprising moving the beater device from one of a first location and a second location to the other one of the first location and the second location;

wherein the beater device is positioned adjacent the drying wheel when the beater device is in the first location, such that the beater device radially penetrates the drying material when the drying wheel is rotating; and wherein the beater device is not positioned adjacent the drying wheel when the beater device is in the second location, such that the beater device is prevented from radially penetrating the drying material when the drying wheel is rotating.

27. The method, as set forth in claim 26, further comprising sending a signal from a controller to move the beater device from the one of the first location and the second location to the other one of the first location and the second location; and wherein moving the beater device is further defined as moving the beater device from one of a first location and a second location to the other one of the first location and the second location in response to receiving the signal from the controller to move the beater device.

* * * * *